(No Model.)  
F. L. BENJAMIN.  
FLAX PULLER.  
No. 521,926.  
2 Sheets—Sheet 1.  
Patented June 26, 1894.

Witnesses:  
C. L. Caldwell.  
A. Mac Natchr.

Inventor:—  
Frederick L. Benjamin,  
per, Paul Mercier  
Attorneys.

(No Model.) 2 Sheets—Sheet 2.
F. L. BENJAMIN.
FLAX PULLER.
No. 521,926. Patented June 26, 1894.

Witnesses:—
C. L. Caldwell.
A. Mac Welch.

Inventor:—
Frederick L. Benjamin,
per Dane T. Merwin
Attorneys.

UNITED STATES PATENT OFFICE.

FREDRICK L. BENJAMIN, OF ST. PAUL, MINNESOTA, ASSIGNOR, BY MESNE ASSIGNMENTS, TO LUCIUS P. ORDWAY, OF SAME PLACE.

FLAX-PULLER.

SPECIFICATION forming part of Letters Patent No. 521,926, dated June 26, 1894.

Application filed March 23, 1891. Serial No. 385,984. (No model.)

*To all whom it may concern:*

Be it known that I, FREDRICK L. BENJAMIN, of St. Paul, Ramsey county, Minnesota, have invented certain Improvements in Flax-Pullers, of which the following is a specification.

My invention relates to improvements in machines for the harvesting of flax, its object being to provide a simple machine, easy of operation, for pulling the plants from the ground and delivering them in suitable shape for being bundled and removed; and consists in providing a reel mounted upon a suitable vehicle and rotated by connections with the driving wheels of the vehicle, so as to cause its wings to pass between the tops of the flax; the reel being provided with attachments for gripping the tops of the flax against the wings of the reel, and holding them until the rotation of the reel has pulled them from the ground, when they are released and dropped upon a suitable apron or platform.

My invention further consists in the construction and combination hereinafter described and particularly pointed out in the claims.

Figure 1:
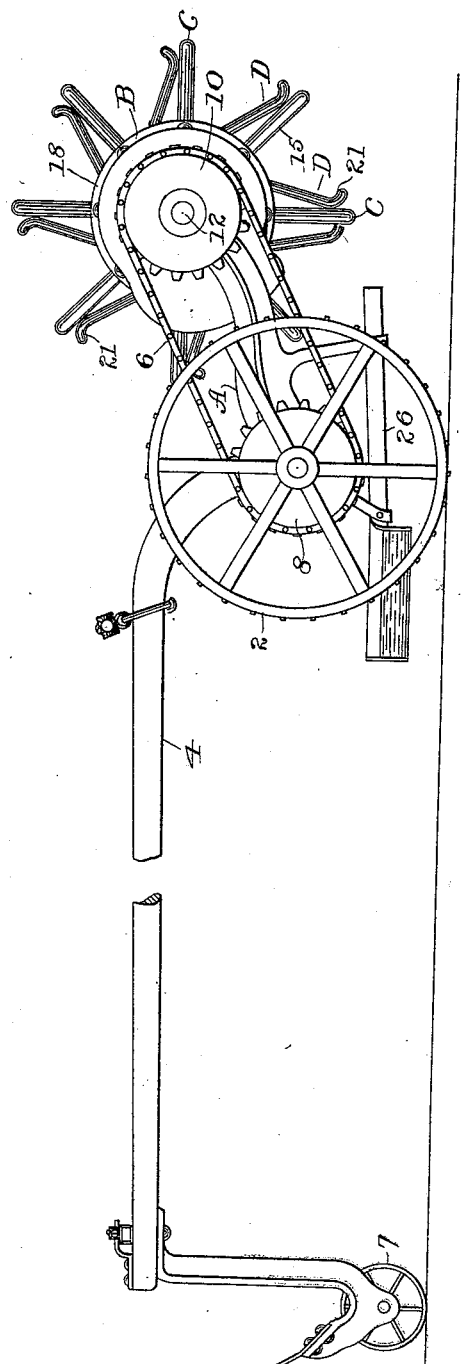
Figure 2:
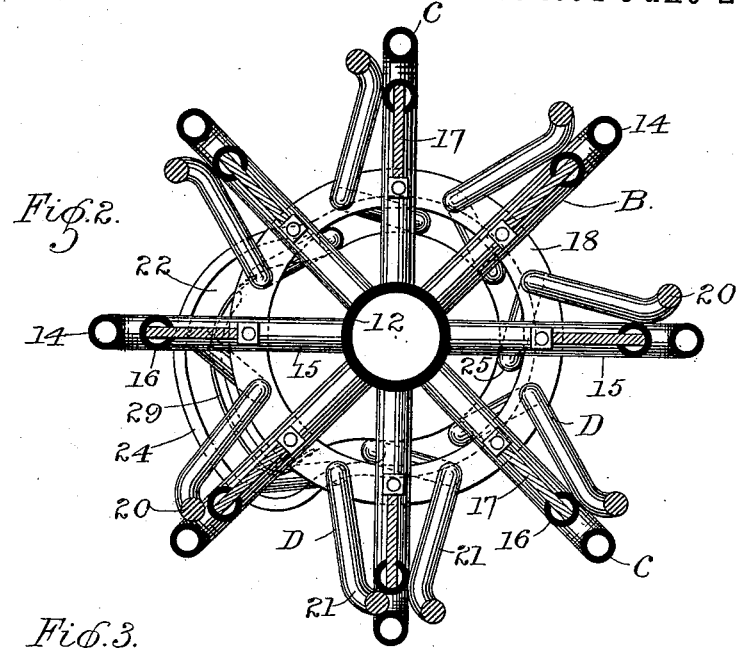
Figure 3:
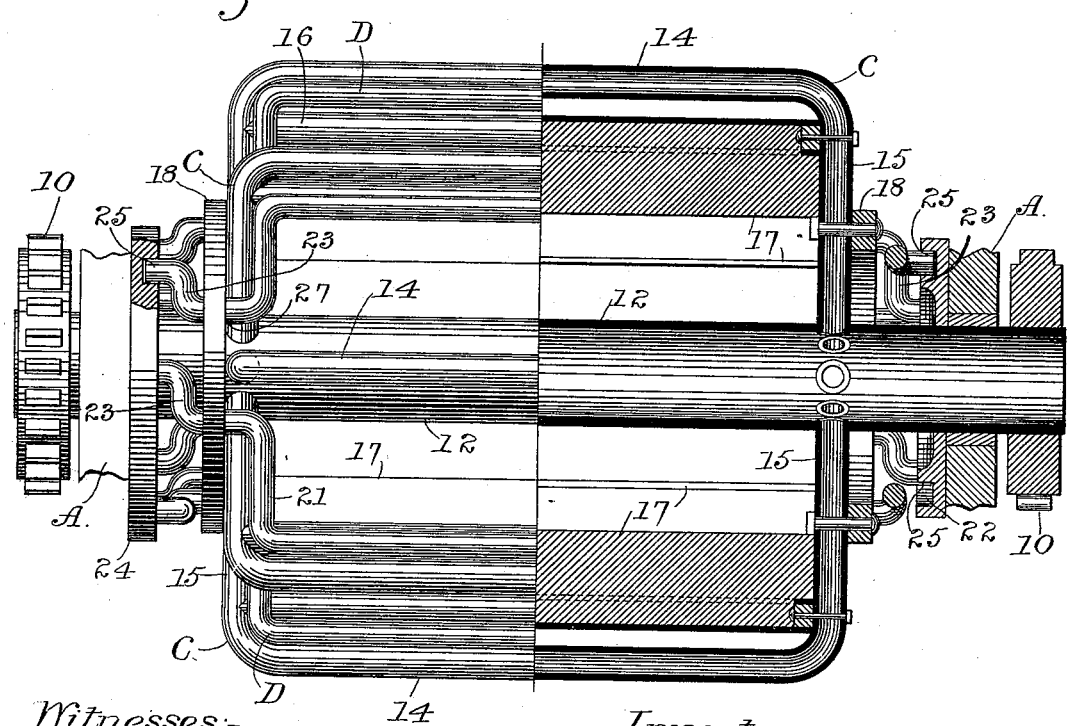

In the accompanying drawings forming part of this specification Figure 1 is a side elevation of my improved machine showing the driving mechanism and the arrangement of the pulling reel upon the same. Fig. 2 is a cross section of the reel showing the arrangement and construction of the fixed wings of the reel and of the hinged or clamp wings, and the means for operating the same, and Fig. 3 is a front elevation and partial longitudinal section of the reel showing the arrangement of the parts and the means for driving the same.

In the drawings, A represents the frame work of the machine supported upon driving wheels 2 and provided with a pole or tongue 4 to which a team may be attached for driving or pushing the machine, and provided with a driver's seat 5 and following wheel 7.

Mounted upon the machine in front of and above the driving wheels is a transverse reel B which is driven by means of chain or link belts 6 running from the sprockets 8 upon the drive wheels, to the sprockets 10 upon the shaft 12 of the reel. The frame of the reel is formed preferably of metallic pipe. The reel is provided with fixed wings C formed of small pipes or tubes 14 parallel with the shaft 12, forming the outer edge of the wings and having their ends 15 bent at right angles therewith, and secured to the shaft. I prefer to secure between the ends of the pipe close to and parallel with the straight part of the pipe, a secondary pipe 16, and also a piece of sheet metal or board 17 extending from the pipe 16 toward the shaft 12, of sufficient width to prevent the clogging of the reel by the branches of the plants. Secured to both ends of the reel are the annular rings 18, in which are hinged intermediate of the fixed wings C, the secondary or clamp wings D formed of pipes or rods 20, similar in form to the pipes 14 of the wings C. The ends 21 of these rods are formed preferably with a slight lateral bend next to the body of the pipe, so that when lying against the adjacent fixed wing it will fit between the pipes 14 and 16 so as to firmly grip the plants between them. The pivots or journals 27 of the clamp wings D extend through the ring 18 and are formed with a double bend 23, the ends 25 extending substantially parallel with the shaft 12 and projecting into the eccentrically curved cam or groove 22 formed in the fixed cam plate 24 inclosing the shaft. This cam or groove is of such form and arranged in such position that when a fixed wing of the reel has turned forward and downward into the flax, the hinged wing in advance of it is thrown back to bear against it, as shown best by Fig. 2, and is held in that position until the reel has turned through a sufficient angle of rotation to pull the plants from the ground and carry them back over the platform or apron 26 of the machine behind the reel. The hinged wing is then turned by the cam so as to throw it away from the fixed wing of the reel, and release the flax which drops upon the platform. It is obvious that by modifying the curve of the cam or groove, the clamping wing may be brought into and held in contact with the fixed wing of the reel at such distance and for such time as may be necessary to accomplish the desired result. In the rear of the reel and between the driving wheels may be arranged any suitable device for receiving the flax and delivering it or discharging it in bunches or bundles. This may be done, for example, by means of the platform 26 upon which the flax falls when dropped by the reel as described, from which it can be discharged on to the ground. This part of the apparatus forms no part of my present invention and a particular description is reserved for a subsequent application.

In order that the hinged wings may bear with elastic pressure against the fixed wings, and yield to the obstacles of the interposed plants, I cut away the face of the cam or inner wall of the groove, at its most eccentric part and secure upon it a flat spring 29 conforming to the proper curve for turning the hinged wings. When the flax plants are clamped between them the spring yields sufficiently to allow the cranks to travel around while gripping the plants firmly enough to pull them from the ground.

I claim—

1. In a device of the class described, the combination of the reel having alternating hinged and fixed ⊔ shaped wings, and means for automatically closing the hinged wings against the fixed wings.

2. In a device of the class described, a horizontally rotating reel having alternating fixed and hinged ⊔ shaped wings, and means for automatically closing the hinged wings against the fixed wings successively at a predetermined point in their rotation.

3. The combination of the reel, having fixed wings and hinged wings intermediate of said fixed wings, and eccentric guides engaging said hinged wings at points off set from their pivots and turning them to and from the fixed wings, substantially as and for the purposes set forth.

4. The combination of the reel, having alternating fixed and hinged wings, and eccentric guides engaging said hinged wings at points offset from their pivots whereby with the rotation of the reel, the hinged wings are turned to and from the fixed wings at predetermined points in their rotation, substantially as and for the purposes set forth.

5. The combination of the reel, having fixed and hinged wings arranged alternately thereon, eccentrics engaging said hinged wings and turning each of said hinged wings alternately against the adjacent fixed wings through predetermined arcs of their rotation, substantially as and for the purposes set forth.

6. In a device of the class described, the combination of a suitable vehicle, a horizontal shaft carried in front thereof, connections for driving said shaft from the vehicle axle, a reel upon said shaft having alternating fixed and hinged ⊔ shaped wings, and eccentrics engaging the hinged wings and closing them against the adjacent fixed wings while passing through a predetermined arc, substantially as described.

7. The combination with a suitable vehicle, of a horizontal reel, carried thereon and rotated by the turning of the vehicle wheels, having fixed wings, and hinged wings intermediate of the fixed wings, eccentrics engaging said hinged wings and automatically turning them through and from the adjacent fixed wings, to a predetermined arc of their rotation, substantially as and for the purposes set forth.

In testimony whereof I have hereunto set my hand this 12th day of March, 1891.

FREDRICK L. BENJAMIN.

In presence of—
T. D. MERWIN,
WARREN CARPENTER.